Sept. 17, 1929.  B. L. M. BUNTING  1,728,227
APPARATUS FOR CUTTING VARIOUS SUBSTANCES
Filed March 23, 1928
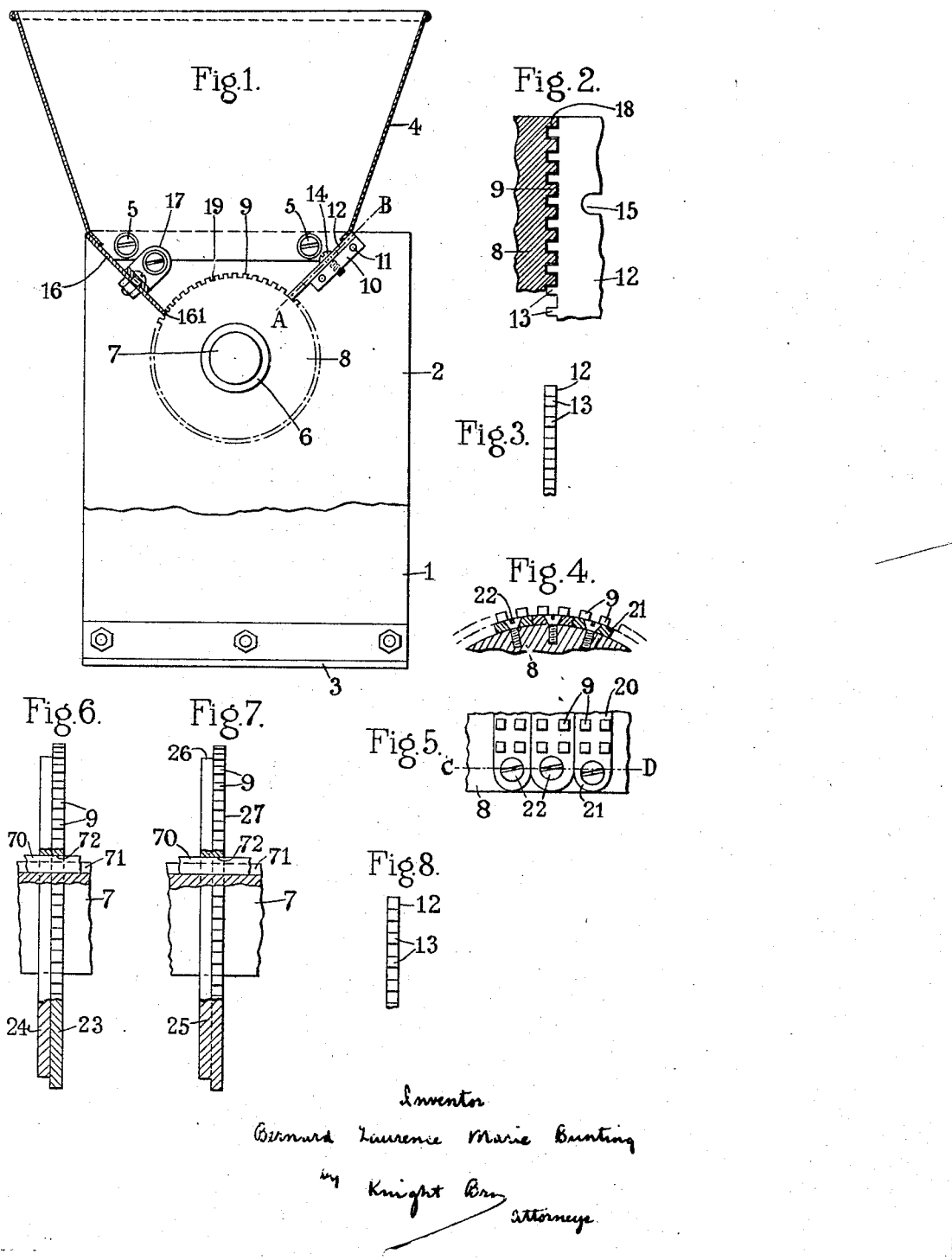

Patented Sept. 17, 1929

1,728,227

UNITED STATES PATENT OFFICE

BERNARD LAURENCE MARIE BUNTING, OF LONDON, ENGLAND

APPARATUS FOR CUTTING VARIOUS SUBSTANCES

Application filed March 23, 1928, Serial No. 264,166, and in Great Britain April 1, 1927.

The object of the present invention is to provide improved apparatus for cutting tea leaves and stalks, and generally for cutting various substances more quickly and more effectively than apparatus hitherto employed for such purposes.

The present invention relates to that kind of cutting apparatus having a rotating cylinder the periphery of which is formed with a number of teeth arranged in lines around its circumference, and in conjunction with which there is employed a stationary plate or knife, having teeth cut along one edge, which enter the grooves between the lines of teeth on the cylinder. Such cylinders have been formed of circumferentially toothed discs separated by distance pieces and fixed upon a shaft. The teeth have had in some cases the profile of rotary saw teeth with sharp entering edges, and in other cases rectangular teeth have been arranged on the roller in helical formation.

According to the present invention the teeth are in the form of rectangular projections, which cut the material to be treated on three edges of each tooth simultaneously across the whole roller, the square edges of which are not liable to be injured when they encounter foreign matter in the form of stones and nails, which remain sharp for a considerable time and may then be readily resharpened by a milling tool. The toothed plate which is normally stationary may be caused to partially rotate about a centre for the purpose of allowing nails and stones to pass without damaging the said cylinder or plate, as in ordinary tea cutting machines.

When cutting some substances the teeth may be larger on one side of the plate than on the other side thereof, the larger sides of the teeth being towards that portion of the cylinder which is approaching the plate. The material which is cut by the edges of the teeth in the plate and the projections on the cylinder will then be able more readily to pass through the gaps in the plate owing to the clearance provided by the smaller edges of the teeth.

It is common practice to employ several rotating cylinders with fixed or partially rotatable knives arranged approximately radially to the cylinders in a single machine, such cylinders having cells or cavities in their outer surfaces. Such cylinders and the straight edged knives used in conjunction with them may be replaced with advantage by cylinders and plates constructed according to the present invention.

The cylinder may be made by turning circumferential grooves therein and then milling straight longitudinal grooves therein parallel to the axle thereby producing projections in the form of rectangles in straight lines. As an alternative construction the cylinder may be made of a number of discs having rectangular teeth cut in their peripheries, which discs are separated from one another on a shaft by means of intermediate discs of smaller diameter, and having plain peripheries. The whole of the discs are connected rigidly upon the shaft in any convenient manner as by mechanical means, soldering and brazing. The cylinder may also be made of discs, each disc having two diameters, the smaller diameter being equivalent to a disc having a plain periphery, and the larger diameter having rectangular teeth cut in its periphery.

The rectangular projections may be formed upon suitable bases which latter are removably fixed to a solid cylinder, thus allowing some of the projections to be removed in case of damage. The bases may, if desired, be located in grooves formed in the periphery of the cylinder, which grooves may be of dove-tail section. In all cases the teeth are arranged in straight circumferential lines and straight longitudinal lines parallel to the axle and each circumferential line is separated from adjacent circumferential lines and each longitudinal line is separated from adjacent longitudinal lines by spaces which are substantially equal to the rectangular projections.

The invention is illustrated in the accompanying drawings in which:

Fig. 1 is a side elevation of the apparatus partly broken away and partly in section.

Fig. 2 is a section through part of the cylinder on the line A—B of Fig. 1 but showing the knife in elevation.

Fig. 3 is an edge view of the knife.

Fig. 4 is a section on the line C—D of Fig. 5 and

Fig. 5 is a plan of part of a cylinder showing one construction thereof.

Figs. 6 and 7 are elevations of part of a cylinder and part of the driving shaft, parts being broken away, and showing two methods of constructing the cylinder.

Fig. 8 is an edge view of the knife showing a modification.

In the construction shown in the drawings 1, 2 are two parallel vertical plates each provided with a base 3 made of angle iron. These plates are connected at their upper ends to a hopper 4 by means of screws 5. The plates 1, 2 are each provided with a bearing 6 for the driving shaft 7. Upon the driving shaft is mounted the cylinder 8 having around its periphery rectangular projections 9, arranged in straight lines across the cylinder.

A supporting plate 10 fits between the two vertical plates 1 and 2, and said plate 10 is provided with screw threaded apertures 11 at each end by means of which it is connected to the plates 1 and 2 as by screws (not shown) passing through apertures in these last mentioned plates. The supporting plate 10 thus acts as a distance piece between the plates 1 and 2 and assists in connecting these last mentioned plates together at their upper ends.

Upon the plate 10 is supported the knife 12 having teeth 13 which approximately fit the circumferential grooves formed between the rows of rectangular projections 9. The knife 12 is adjustably fixed to the plate 10 by means of two screws 14 passing through slots 15 in the knife 12.

A plate 16 is carried by a support 17 which is screwed at its ends to the plates 1 and 2. The support 17 acts as a distance piece between the plates 1 and 2 and rigidly connects these plates together at one part. The plate 16 closes the lower portion of the hopper 4 at one side, and the knife 12 closes the lower portion of the hopper 4 at the other side. The plate 16 is also provided with teeth 161 fitting between the rectangular projections 9 like the teeth 13.

The cylinder 8 may be made from a single piece of metal having circumferential grooves 18 turned in its periphery and straight longitudinal grooves 19 milled therein parallel to the axle. Such a solid cylinder is shown partly in section in Fig. 2. When thus made the projections 9 are rectangular in form and are separated by spaces which are equal to the rectangular projections. The projections 13 on the edge of the knife 12 may have parallel sides, as shown in Fig. 8, like the projections 9. If desired the projections 13 may be made slightly wider at their front edges, as shown in Fig. 3.

In Figs. 4 and 5 the rectangular projections 9 are formed upon base plates 20 which are provided at both ends with perforated lugs 21 to receive screws 22 entering screwed apertures in the cylinder 8. Should any of the rectangular projections 9 be injured by a nail, a stone, or otherwise, one of the base plates 20 can be detached from the cylinder and be replaced by a new plate.

As shown in Fig. 6 the cylinder may be made up of discs 23 having rectangular teeth 9 cut on their peripheries, and said discs 23 may be separated from each other by means of plain discs 24. Both sets of discs 23 and 24 are threaded on to the shaft 7 and are secured thereon in any suitable manner as by soldering. A long key 70 may also be employed partly entering a groove 71 in the shaft 7 and grooves 72 in the discs 23 and 24, as shown in Fig. 6.

The cylinder 8 may be built up of discs 25 shown in Fig. 7, each of which has a circular plain part 26 and another part of larger diameter 27 which is formed on its outer edge with rectangular projections 9. The discs 25 are threaded upon a shaft 7 and are secured thereon in any suitable manner.

A slight air space is shown between the projections 9 on the cylinder 8 and the teeth 13 on the knife 12, in Fig. 2, in order to show the two parts distinctly, but it will be understood that these parts fit more closely together in order to cut on three edges of each tooth.

What I claim as my invention is:—

1. An improved apparatus for cutting various substances having in combination a driving shaft, a plain cylinder mounted upon said shaft, rectangular projections upon the periphery of the plain cylinder arranged in straight circumferential lines and straight longitudinal lines, each circumferential line being separated from adjacent circumferential lines and each longitudinal line being separated from adjacent longitudinal lines by spaces which are equal to the rectangular projections, and a normally stationary knife having rectangular teeth cut along one edge which fit within the spaces between the circumferential lines of rectangular projections on the surface of the plain cylinder substantially as set forth.

2. An improved apparatus for cutting various substances having in combination a driving shaft, a plain cylinder mounted upon said shaft, base plates in contact at their edges, each having a perforated lug at both ends by which they are fixed to the cylinder, rectangular projections upon said base plates intermediate of said perforated lugs, said projections being arranged in straight circumferential lines and straight longitudinal lines around the cylinder, each circumferential line being separated from adjacent circumferential lines and each longitudinal line being separated from adjacent longitudinal lines by spaces which are equal to the rectangular projections, and a normally stationary knife having rectangular teeth cut along one edge which fit within the spaces between the circumferential lines of rectangular projections substantially as set forth.

3. An improved apparatus for cutting various substances having in combination a driving shaft, a plain cylinder mounted upon said shaft, rectangular projections arranged upon the periphery of said cylinder in straight circumferential lines and straight longitudinal lines, each circumferential line being separated from adjacent circumferential lines and each longitudinal line being separated from adjacent longitudinal lines by spaces equal to the rectangular projections, and a normally stationary knife having teeth along one edge of said knife which are rectangular on their front and rear edges, the front edges being wider than the rear edges, and which fit within the spaces between the circumferential lines of rectangular projections substantially as set forth.

4. An improved apparatus for cutting various substances having in combination two parallel plates, bearings carried by said plates, a driving shaft in said bearings, a plain cylinder upon said driving shaft, a hopper carried by said parallel plates, a plate having teeth closing the lower part of one side of the hopper, a normally stationary knife closing the lower part of the opposite side of said hopper, rectangular projections in straight circumferential lines and straight longitudinal lines, each circumferential line being separated from adjacent circumferential lines and each longitudinal line being separated from adjacent longitudinal lines by spaces which are equal to the rectangular projections, upon the periphery of said plain cylinder, rectangular teeth upon one edge of said normally stationary knife which fit within the spaces between the circumferential lines of rectangular projections and means for adjusting the said normally stationary knife and its teeth with respect to the said plain cylinder substantially as set forth.

In witness whereof I have hereunto set my hand.

BERNARD LAURENCE MARIE BUNTING.